Patented Jan. 2, 1951

2,536,647

UNITED STATES PATENT OFFICE 2,536,647

PROCESS OF PREPARING BIS(BETA-CHLOR-ETHYL)-PARA-NITROPHENYL THIOPHOSPHATE

Gennady M. Kosolapoff, Dayton, Ohio, assignor to Monsanto Chemical Company, St. Louis, Mo., a corporation of Delaware No Drawing. Application March 6, 1948, Serial No. 13,530

2 Claims. (Cl. 260—461)

This invention provides a new composition of matter which is a thiophosphoric acid ester and also provides a process for producing the same.

It is known that diethyl p-nitrophenyl thiophosphate possesses insecticidal properties. As a result of research conducted upon the insecticidal activity of diethyl p-nitrophenyl thiophosphate and also upon related compounds, I have discovered that compounds containing 2 β-chloroethyl groups substituted on a thiophosphoric acid residue, which also contain the p-nitrophenyl group, possess greatly enhanced insecticidal activity. The present compound has also shown excellent killing power upon the eggs of various insects.

By the present invention bis-(β-chloroethyl)-p-nitrophenyl thiophosphate may be readily prepared by a simple method and the new compound obtained in good yields.

The present compound has the structure:

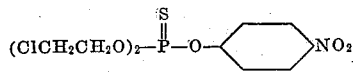

The process for preparing the above compound is carried out in the following manner:

PCl₃ is first treated with two moles of ethylene oxide per mole of PCl₃, which reaction forms bis-(β-chloroethyl)-phosphite chloride. The reaction for producing this compound may be carried out in the presence or in the absence of a solvent. However, in order to obtain the compound in the most advantageous manner I prefer to employ a solvent. Any inert solvent such as the aromatic hydrocarbons including benzene, toluene, xylene, etc. may be used.

As contrasted with previously known methods for producing thiophosphoryl chloride wherein the reaction of sulfur and PCl₃ is carried out at high temperatures in sealed tubes, the addition of sulfur to bis-(β-chloroethyl)-phosphite chloride proceeds readily and smoothly at relatively low temperatures. The requisite amount of sulfur is merely added to bis-(β-chloroethyl)-phosphite chloride, preferably in a solvent and the solution heated to 70° C. to 80° C. A reaction takes place which yields bis-(β-chloroethyl)-thiophosphoryl chloride.

In a separate vessel, p-nitrophenol is treated with an equivalent quantity of an alkali metal hydroxide, such as sodium or potassium hydroxide so as to form the corresponding alkali metal p-nitrophenate. This step of the process may also be carried out in the presence or in the absence of a solvent.

The alkali metal nitrophenate is then mixed with the bis-(β-chloroethyl)-thiophosphoryl chloride. The proportions of the reactants employed are such as to supply to the reacting mixture sufficient alkali metal in the form of the alkali metal phenate in order to combine with all of the chlorine which is attached to the phosphorus atom in the bis-(β-chloroethyl)-thiophosphoryl chloride.

The condensation reaction mentioned above is preferably carried out in any of the solvents which are described above. The mixture of the reactants is boiled under reflux for a sufficient length of time so as to complete the reaction. The reaction mass resulting therefrom is washed with water in order to remove the sodium chloride formed, after which the water containing the dissolved sodium chloride is separated and the solvent present is evaporated. The desired product remains upon evaporation of the solvent.

The following specific example further illustrates this invention, it is, however, not to be considered as limitative thereof:

Example 34.5 grams of PCl₃ in 200 cc. of xylene was treated in the cold with ethylene oxide until 22 grams was absorbed. The product was then treated with 8 grams of sulfur, stirred and then heated to 75° C. for 4 hours. The solution was then filtered. The filtrate contains bis-(β-chloroethyl)-thiophosphoryl chloride.

In a separate flask 35 grams of p-nitrophenol dissolved in 500 cc. of mono-chlorobenzol was neutralized by the addition thereto of sodium hydroxide, the neutralization reaction resulting in the formation of sodium nitrophenate. This compound which forms a suspension in the solvent is then dried to remove any water present and is then mixed with the solution of bis-(β-chloroethyl)-thiophosphoryl chloride and the resulting mixture boiled under reflux with stirring for approximately 18 hours. The solution is then cooled, extracted with water, the layers separated, the organic layer distilled in order to remove solvent and the desired product obtained as the residue in the distillation flask. The product obtained has the structural formula:

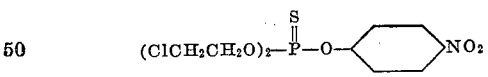

and was obtained in 83 gram yield as a reddish-brown, viscous oil.

By varying the ratio of ethylene oxide to PCl₃ employed in the production of the bis-(β-chloroethyl)-phosphite chloride, as described above, either the mono-β-chloroethyl phosphite chloride or the bis-(β-chloroethyl)-phosphite chloride may be produced or mixtures of the two may be obtained. Since, however, the bis-(β-chloroethyl)-p-nitrophenyl thiophosphate has much greater biological activity than the β-chloroethyl bis-(p-nitrophenyl)-thiophosphate, I prefer to utilize two moles of ethylene oxide per mole of $PCl_3$ in the first step of the process. By proceeding in this manner, the desired product, namely, bis-(β-chloroethyl)-p-nitrophenyl thiophosphate is obtained in high yield without the accompanying presence of an inert material in the final product.

The present compound is valuable as an insecticidal agent. For purposes of practical application as an insecticide the present compound may be dissolved, suspended or dispersed in any suitable insecticide carrier such as solvents, emulsions or dusts. Where solutions of the present compound are prepared for insecticidal application, suitable solutions may be made in toluene, xylene or any of the various petroleum distillates of suitable boiling range. The present active ingredients may also be formulated by mixing with various dry powders, such as powdered sulfur, bentonite, talc, pyrophyllite, carbon black, etc., the carrier being sufficiently finely divided so as to permit dusting of infected foliage therewith. Although the present compound is insoluble in water, it is nevertheless possible to prepare dispersions of the same in water or in aqueous solutions utilizing suitable emulsifying or wetting agents, such as a dodecyl benzene, sodium sulfonate, soaps, Turkey red oil, etc. For general application to infected foliage, it is generally the practice to mix the active ingredient together with the insecticide carrier so as to produce compositions containing from 0.5% to 10% of the active ingredient in the final composition. The present insecticide may be used alone or it may be used in combination with other insecticidal agents, such as nicotine, pyrethrum, or α,α-(p-chlorophenyl)-β,β,β-trichloroethane (DDT) in any desired proportions.

The present compound is an active agent for the control not only of live insects, such as aphids, mites, lice, moths, etc., but also has been found to kill the eggs of these and other insects.

What I claim is:

1. In the process for producing bis-(β-chloroethyl)-p-nitrophenyl thiophosphate the steps which comprise adding sulfur to bis-(β-chloroethyl) phosphite chloride in an organic solvent and heating the solution in order to form bis-(β-chloroethyl)-thiophosphoryl chloride and then reacting the latter with an alkali metal p-nitrophenate.

2. In the process for producing bis-(β-chloroethyl)-p-nitrophenyl thiophosphate, the steps which consist in adding sulfur to bis-(β-chloroethyl) phosphite chloride in an organic solvent and at a temperature of 70° C. to 80° C. to form bis-(β-chloroethyl)-thiophosphoryl chloride and then reacting the latter with sodium p-nitrophenate.

GENNADY M. KOSOLAPOFF.

REFERENCES CITED

The following references are of record in the file of this patent:

UNITED STATES PATENTS

| Number | Name | Date |
|--------|------|------|
| 1,936,985 | Lommel et al. | Nov. 28, 1933 |
| 2,250,049 | Moyle | July 22, 1941 |

OTHER REFERENCES

F. I. A. T. Final Report No. 949, "Organic Chemical Intermediates for Insecticides, Fungicides and Rodenticides," by J. T Thurston, dated October 14, 1946, Office of Publications Board, Department of Commerce Publication No. P. G. 60,890, pages 19 and 20.